(12) United States Patent
Oya et al.

(10) Patent No.: US 10,199,139 B2
(45) Date of Patent: Feb. 5, 2019

(54) INSULATED WIRE, MOTOR COIL, ELECTRIC/ELECTRONIC EQUIPMENT AND METHOD OF PRODUCING INSULATED WIRE

(71) Applicants: FURUKAWA ELECTRIC CO., LTD., Tokyo (JP); FURUKAWA MAGNET WIRE CO., LTD., Tokyo (JP)

(72) Inventors: Makoto Oya, Tokyo (JP); Tsuneo Aoi, Tokyo (JP)

(73) Assignees: FURUKAWA ELECTRIC CO., LTD., Tokyo (JP); FURUKAWA MAGNET WIRE CO., LTD., Tokyo (JP)

(*) Notice: Subject to any disclaimer, the term of this patent is extended or adjusted under 35 U.S.C. 154(b) by 0 days.

(21) Appl. No.: 15/192,162

(22) Filed: Jun. 24, 2016

(65) Prior Publication Data

US 2016/0307668 A1 Oct. 20, 2016

Related U.S. Application Data

(63) Continuation of application No. PCT/JP2014/083363, filed on Dec. 17, 2014.

(30) Foreign Application Priority Data

Dec. 26, 2013 (JP) .................. 2013-270573

(51) Int. Cl.
*H01B 7/02* (2006.01)
*H01F 5/06* (2006.01)
(Continued)

(52) U.S. Cl.
CPC .......... *H01B 7/0225* (2013.01); *H01B 13/141* (2013.01); *H01B 13/146* (2013.01);
(Continued)

(58) Field of Classification Search
USPC ..................................... 174/120 R
See application file for complete search history.

(56) References Cited

U.S. PATENT DOCUMENTS 2,523,999 A * 9/1950 Sattler .................. C08G 69/44
174/120 R
7,655,867 B2 * 2/2010 Schafer ................. H01F 27/322
174/120 R
(Continued)

FOREIGN PATENT DOCUMENTS

CN 102844822 A 12/2012
JP S61161607 * 1/1985
(Continued)

OTHER PUBLICATIONS

International Search Report (PCT/ISA/210) issued in PCT/JP2014/083363, dated Mar. 31, 2015.
(Continued)

*Primary Examiner* — William H Mayo, III
*Assistant Examiner* — Krystal Robinson
(74) *Attorney, Agent, or Firm* — Birch, Stewart, Kolasch & Birch, LLP

(57) ABSTRACT

An insulated wire containing: at least one thermosetting resin layer; and at least one thermoplastic resin layer, provided in this order on a conductor having a rectangular cross-section, a curvature radius r of corner portions at both edges of at least one short side of the conductor being 0.6 mm or less, in which thickness t1 of the corner portion of the thermosetting resin layer and thickness t2 of the corner portion of the thermoplastic resin layer satisfy a relation expressed by the following Formula 1:

$t2/t1 < 1;$  Formula 1:

and a method of producing thereof, a motor coil, and an electric/electronic equipment.

9 Claims, 2 Drawing Sheets

(51) Int. Cl.
  *H02K 3/32*   (2006.01)
  *H01B 13/14*  (2006.01)
  *H01F 27/28*  (2006.01)
  *H02K 3/30*   (2006.01)

(52) U.S. Cl.
  CPC ........... *H01F 5/06* (2013.01); *H01F 27/2823* (2013.01); *H02K 3/30* (2013.01); *H02K 3/32* (2013.01)

(56) References Cited

U.S. PATENT DOCUMENTS

| | | | | |
|---|---|---|---|---|
| 7,750,242 | B2 * | 7/2010 | Fukuchi | H01B 3/441 174/110 R |
| 7,872,390 | B2 * | 1/2011 | Baumann | H02K 3/32 174/120 R |
| 2003/0012882 | A1 * | 1/2003 | Tokuhisa | B32B 15/08 427/385.5 |
| 2004/0245010 | A1 * | 12/2004 | Banks | H01F 27/323 174/120 R |
| 2008/0164050 | A1 * | 7/2008 | Kamibayashi | H01F 27/323 174/119 R |
| 2011/0174521 | A1 | 7/2011 | Hernandez-Hernandez et al. | |
| 2012/0279752 | A1 | 11/2012 | Oya et al. | |

FOREIGN PATENT DOCUMENTS

| | | | |
|---|---|---|---|
| JP | 60-121607 | A | 6/1985 |
| JP | 61-161607 | A | 7/1986 |
| JP | 2005-203334 | A | 7/2005 |
| JP | 2005203334 | A * | 7/2005 |
| JP | 101080781 | A | 11/2007 |
| JP | 4177295 | B2 | 11/2008 |
| JP | 2011-78232 | A | 4/2011 |
| JP | 5137749 | B2 | 2/2013 |
| JP | 5196532 | B2 | 5/2013 |
| WO | WO 2006/065519 | A1 | 6/2006 |

OTHER PUBLICATIONS

Written Opinion (PCT/ISA/237) issued in PCT/JP2014/083363, dated Mar. 31, 2015.

Chinese Office Action and Search Report, dated Apr. 19, 2017, for corresponding Chinese Application No. 201480070379.1, with an English translation.

Extended European Search Report, dated Jul. 24, 2017, for corresponding European Application No. 14873225.8.

* cited by examiner (a)   (b)

| Flexibility | | |
|---|---|---|
| | A crack was occurred in film. | Edge-wise bending property was good. |

Edge-wise bending at d = 1.5 in case of 1.5 mm × 2.4 mm

INSULATED WIRE, MOTOR COIL, ELECTRIC/ELECTRONIC EQUIPMENT AND METHOD OF PRODUCING INSULATED WIRE

CROSS-REFERENCE TO RELATED APPLICATIONS

This application is a continuation of PCT/JP2014/083363 filed on Dec. 17, 2014 which claims benefit of Japanese Patent Application No. 2013-270573 filed on Dec. 26, 2013, the subject matters of which are incorporated herein by reference in their entirety.

TECHNICAL FIELD

The present invention relates to an insulated wire, a motor coil, electric/electronic equipment and a method of producing an insulated wire.

BACKGROUND ART

It has become demanded to further improve various performances, such as heat resistance, mechanical properties, chemical properties, electrical properties, and reliability, in the electrical equipments developed in recent years, as compared to the conventional electrical equipments. Under the situations, excellent abrasion resistance, thermal aging resistance property, and solvent resistance have become required from insulated wires, such as enameled wires, that are used as magnet wires for electrical equipments for aerospace use, electrical equipments for aircraft, electrical equipments for nuclear power, electrical equipments for energy, and electrical equipments for automobiles. For example, in the recent years, for electrical equipments, it sometimes has been required to show an excellent thermal aging resistance over a long period of time of use.

On the other hand, in recent years, advance of the electrical equipment represented by motors or transformers, has been progressed resulting in size reduction and improved performance. Thus, it becomes usual in many cases that insulated wires are used in such a way that the insulated wires are processed by winding (coil processing) and they are pushed into a quite small space to pack. Specifically, it is no exaggeration to say that the performance of a rotator, such as a motor, is determined by how many wound wires produced by processing the insulated wires into a coil shape can be held in a stator slot. As a result, improvement of the ratio of the sectional area of conductors to the sectional area of the stator slot (space factor described below) has been required to be particularly highly increased.

For the reasons discussed above, it has been lately attempted to use a rectangular wire in which the conductor has a shape similar to a quadrilateral (square or rectangle), as a means for increasing the space factor. Use of a rectangular wire exhibits a dramatic effect in increasing the space factor. However, a corner portion of cross-section rectangular is extremely brittle to bending processing such as coil processing. Due to this, there is a problem that a coated film cracks when the rectangular wire is processed by applying strong pressure. In particular, it is known that the crack of the coated film tends to occur more easily as the curvature radius of the corner portion is smaller.

Further, regarding the insulated wire-processed coil which is used for a motor and the like, a response to a high electric current is sought in accordance with the high efficiency of the motor in recent years. Specifically, because an electric current is carried to a coil thereby raising the coil to high temperature, the above-described thermal aging resistance property is sought to the coil. Further, if embrittlement of the coil occurs due to vibration or the like, the embrittlement causes dielectric breakdown and therefore it is necessary to maintain flexibility and the like required as the coil which may be used even under a continuing heat environment.

Patent Literature 1 attempts to thicken an insulating film in order to solve a problem of the partial discharge and proposes to provide a thermoplastic resin having a low-relative permittivity as a coat resin on the outside of an enamel wire.

However, thickening of the insulating film decreases a space factor of the miniaturized equipment and therefore an adequate improvement is required.

Patent Literature 2 proposes to make the curvature radius of the insulating coat layer of the insulated wire smaller than a predetermined value in order to relax concentration of electric field which occurs when a corner portion of the insulated wire having an appropriately rectangular-shaped cross-section is adjoined to or comes into contact with a flat portion of an adjacent wire.

However, there is no description about the above-described thermal aging resistance property in Patent Literature 2.

Patent Literature 3 attempts to increase thickness of the insulating film of the rectangular wire in order to solve the problem of partial discharge. For example, it is proposed to coat a thermoplastic resin on an enameled rectangular wire. However, thickening of the insulating film decreases a space factor.

CITATION LIST

Patent Literatures

Patent Literature 1 Japanese Patent No. 4177295
Patent Literature 2 Japanese Patent No. 5137749
Patent Literature 3 Japanese Patent No. 5196532

SUMMARY OF INVENTION

Technical Problem

It is contemplated that making the curvature radius of the conductor smaller is required in order to achieve a much higher space factor hereafter. However, if the curvature radius at a corner portion of the conductor becomes small, a crack generation easily occurs on an insulating coat layer of the insulated wire by a bending work thereof.

From the above viewpoint, the present inventors focused attention on the edge-wise bending workability in which an edge surface is bent and, as a result of further studies, have found that a bending workability of the insulated wire, particularly a bending workability in terms of the edge-wise bending in which an edge surface is bent can be improved by an insulating coat layer having a particular constitution, even in the case where the curvature radius at a corner of the conductor is small.

The term "edge surface" described here means a surface which is continuously formed in the direction of axis by a short side in a cross-section of the rectangular wire. On the other hand, the term "flat surface" described here means a surface which is continuously formed in the direction of axis by a long side in a cross-section of the rectangular wire.

The present invention was made to solve the above-described problems and is contemplated for providing an insulated wire having resistance to the edge-wise bending thereby enabling to improve a space factor in the electrical equipment, even in the case where the curvature radius at a corner of the conductor is small, and is contemplated for providing a method of manufacturing the same. Further, the present invention is contemplated for providing an insulated wire having excellent thermal aging resistance property in addition to the edge-wise bending workability and the space factor, and is contemplated for providing a method of manufacturing the same. Further, the present invention is contemplated for providing a motor coil and electric/electronic equipments employing an insulated wire having the above-described excellent performance.

Solution to Problem

The above-described problems can be solved by the following means.

(1) An insulated wire comprising:
at least one thermosetting resin layer; and
at least one thermoplastic resin layer, provided in this order on a conductor having a rectangular cross-section, a curvature radius r of corner portions at both edges of at least one short side of the conductor being 0.6 mm or less,
wherein thickness t1 of the corner portion of the thermosetting resin layer and thickness t2 of the corner portion of the thermoplastic resin layer satisfy a relation expressed by the following Formula 1:

$$t2/t1<1. \quad \text{Formula 1:}$$

(2) The insulated wire described in the above item (1), wherein the curvature radius r of the corner portion is 0.4 mm or less and t1 and t2 satisfy a relation expressed by the following Formula 2:

$$t2/t1 \leq 0.7. \quad \text{Formula 2:}$$

(3) The insulated wire described in the above item (1) or (2), wherein t1 is 50 μm or more.
(4) The insulated wire described in any one of the above items (1) to (3), wherein a tensile modulus at 25° C. of the thermosetting resin layer is larger than a tensile modulus at 25° C. of the thermoplastic resin layer.
(5) The insulated wire described in any one of the above items (1) to (4), wherein a difference between the tensile modulus at 25° C. of the thermosetting resin layer and the tensile modulus at 25° C. of the thermoplastic resin layer (a difference in terms of "a tensile modulus at 25° C. of the thermosetting resin layer"-"a tensile modulus at 25° C. of the thermoplastic resin layer") is 250 MPa or more and the tensile modulus at 25° C. of the thermoplastic resin layer is more than 2,500 MPa.
(6) The insulated wire described in any one of the above items (1) to (5), wherein at least one resin constituting the thermoplastic resin layer is a thermoplastic resin selected from the group consisting of a polyether ether ketone, a modified polyether ether ketone, a thermoplastic polyimide, and an aromatic polyimide.
(7) The insulated wire described in any one of the above items (1) to (6), having an interlayer comprising a non-crystalline thermoplastic resin between the thermoplastic resin layer and the thermosetting resin layer.
(8) A motor coil comprising the insulated wire described in any one of the above items (1) to (7) which has been subjected to a wind-processing.
(9) An electric/electronic equipment produced by processing the insulated wire described in any one of the above items (1) to (7) by winding.
(10) A method of producing an insulated wire comprising at least one thermosetting resin layer and at least one thermoplastic resin layer, provided in this order on a conductor having a rectangular cross-section, a curvature radius r of corner portions at both edges of at least one short side of the conductor being 0.6 mm or less, comprising a step of:
baking the thermosetting resin layer; and
extrusion-molding the thermoplastic resin layer, thereby to make thickness t1 of a corner portion of the thermosetting resin layer and thickness t2 of a corner portion of the thermoplastic resin layer satisfy a relation expressed by the following Formula 1:

$$t2/t1<1. \quad \text{Formula 1:}$$

In the description, the term "a conductor having a rectangular cross-section" may be referred to simply as "a conductor". Further, the term "a corner portion of a conductor" means a curved portion of the conductor formed by a predetermined curvature radius.

In the description, the term "a corner portion of a thermosetting resin layer" means a region of the thermosetting resin layer which coats a corner portion of a conductor. The term "a corner portion of a thermoplastic resin layer" means a region of the thermoplastic resin layer which coats a thermosetting resin layer which coats a corner portion of a conductor. The term "a corner portion of an interlayer" means a region of the interlayer layer which further coats a thermosetting resin layer which coats a corner portion of a conductor.

Further, in the description, the term "side portion" indicates a side or a surface other than a corner portion of each layer.

Further, in the description, the conductor having a rectangular cross-section means to include both an approximately rectangular conductor whose cross-section has, at the corner portion, a curvature radius described below and an approximately cubic conductor whose cross-section has, at the corner portion, a curvature radius described below.

Meanwhile, in the description, a composite layer composed of a thermosetting resin layer, a thermoplastic resin layer, and an optional interlayer and the like is referred to as an insulating layer.

Advantageous Effects of Invention

The present invention enables to provide an insulated wire which is excellent in a space factor and a workability of an edge surface, namely an edge-wise bending test, and to provide a method of producing the insulated wire. Further, the present invention enables to provide an insulated wire which is excellent in a space factor, an edge-wise bending workability and a thermal aging resistance property, and to provide a method of producing the insulated wire. Further, the present invention enables to provide a motor coil, and an electric/electronic equipment, each of which employs an insulated wire exhibiting an excellent performance.

Other and further features and advantages of the invention will appear more fully from the following description, appropriately referring to the accompanying drawings.

MODE FOR CARRYING OUT THE INVENTION

Hereinafter, a preferable embodiment the insulated wire of the present invention will be explained, with reference to the drawings.

Figure 1:
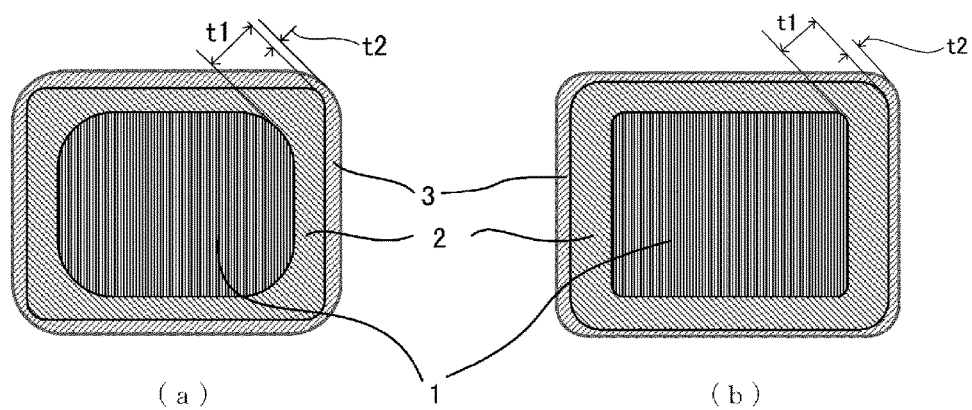
FIG. 1(a) is a schematic cross-section view of an insulated wire in accordance with one embodiment of the present invention.
FIG. 1(b) is a cross-section view of an insulated wire in accordance with one embodiment of the present invention, the insulated wire being composed of a conductor having a smaller curvature radius than the curvature radius of the corner portion of the conductor shown in FIG. 1(a).

In the embodiment of an insulated wire of the present invention shown by the cross-section view in FIG. 1(a), the insulated wire has a conductor 1, a thermosetting resin layer 2 composed of a thermosetting resin coated on an outer periphery of a conductor 1, and a thermoplastic resin layer 3 composed of a thermoplastic resin coated on an outer periphery of the thermosetting resin layer 2. Meanwhile, in FIGS. 1(a) and 1(b), t1 represents a thickness of the thermosetting resin layer, while t2 represents a thickness of the thermoplastic resin layer.

In FIGS. 1(a) and 1(b), (i) a distance from the point where "the straight line" intersects a line of the outer periphery of the conductor to the point where "the straight line" intersects a line of the outer periphery of the thermosetting resin layer is defined as t1, while (ii) a distance from the point where "the straight line" intersects the line of the outer periphery of the thermosetting resin layer to the point where "the straight line" intersects a line of the outer periphery of the thermoplastic resin layer is defined as t2. In this definition, the term "straight line" means a straight line which connects a center of the conductor and a center of the circle expressed by a curvature radius r at the corner portion of the conductor.

The embodiment of the insulated wire of the present invention shown by the cross-section view in FIG. 1(b) is an insulated wire using a rectangular conductor as the conductor 1, in which a curvature radius of the corner portion in the cross-section is smaller than the curvature radius of the conductor 1 shown in FIG. 1(a), and the thermosetting resin layer and the thermoplastic resin layer satisfy the definition of the film thickness in the whole circumference direction. Otherwise, the insulated wire shown in FIG. 1(b) is the same as the insulated wire shown in FIG. 1(a).

Figure 2:
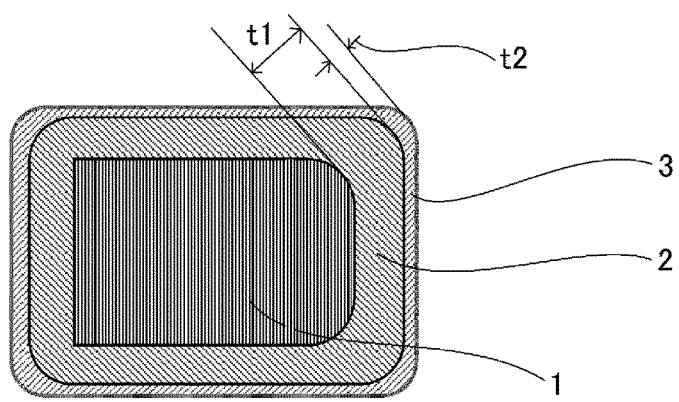
FIG. 2 is a cross-section view of an insulated wire in accordance with one embodiment of the present invention, in which corner portions at both edges in one short side of a conductor having a rectangular cross-section have a curvature radius of more than 0.

FIG. 2 is a cross-section view of an insulated wire in accordance with one embodiment, in which corner portions at both edges in one short side of 4 corner portions of the conductor having a rectangular cross-section as a conductor 1 have a curvature radius of more than 0. This insulated wire is the same as the insulated wire shown in FIGS. 1(a) and 1(b), except for the corner portion of the conductor.

Figures 3, 4:
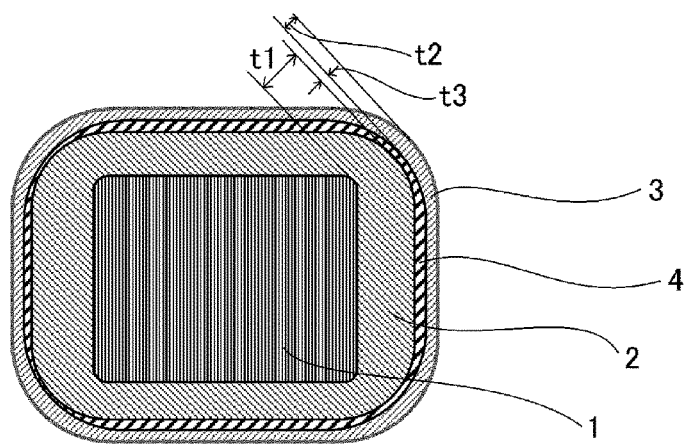
FIG. 3 is a schematic cross-section view of an insulated wire in accordance with one embodiment of the present invention, the insulated wire having an interlayer between a thermosetting resin layer and a thermoplastic resin layer.
FIG. 4 is a schematic view showing an appearance of a crack generation in an insulated film by an edge-wise test which does not make any incision in the insulating film.

In the embodiment of an insulated wire of the present invention shown by the cross-section view in FIG. 3, an interlayer 4 exists between a thermosetting resin layer 2 and a thermoplastic resin layer 3. Otherwise, this insulated wire is basically the same as those shown in FIGS. 1(a) and 1(b), and FIG. 2.

Meanwhile, in FIG. 3, t3 represents a thickness of the interlayer.

In FIG. 3, (i') a distance from the point where "the straight line" intersects a line of the outer periphery of the conductor to the point where "the straight line" intersects a line of the outer periphery of the thermosetting resin layer is defined as t1, (ii') a distance from the point where "the straight line" intersects the line of the outer periphery of the thermosetting resin layer to the point where "the straight line" intersects a line of the outer periphery of the interlayer is defined as t3, and (iii') a distance from the point where the straight line intersects the line of the outer periphery of the interlayer to the point where the straight line intersects a line of the outer periphery on the outside of the thermoplastic resin layer is defined as t2. In this definition, the term "straight line" means a straight line which connects a center of the conductor and a center of the circle expressed by a curvature radius r at the corner of the conductor, and the straight line is viewed as an extension thereof.

FIG. 4 is a schematic view showing an appearance of film crack generation in a thermosetting resin layer by an edge-wise test which does not make any incision in the insulating coat layer. This test is one of methods in which the low workability as the insulated wire can be confirmed by a crack of the external film.

<<Insulated Wire>>

The insulated wire of the present invention has a thermosetting resin layer (A) (also referred to as an enamel-baking layer) and a thermoplastic resin layer (B) provided in this order on a conductor. Further, in the insulated wire of the present invention, an interlayer, for example, a non-crystalline resin layer (C) as an adhesive layer, may be disposed between the thermosetting resin layer (A) and the thermoplastic resin layer (B). The insulated wire of the present invention is composed of a multilayer resin coat insulated wire having at least a thermoplastic resin layer (B) (also referred to as an extrusion-coat resin layer) on the outer periphery of said thermosetting resin layer (A).

Meanwhile, each of these layers may be a single layer, or may be composed of multiple layers of 2 or more layers.

Hereinafter, the components are described from a conductor.

<Conductor>

As for the conductor used in the present invention, a material thereof is not limited, as long as it has electrical conductivity. Examples thereof include copper, a copper alloy, aluminum, an aluminum alloy, and the like. However, the present invention is not limited to these materials. In a case where the conductor is copper, for example, when copper is melted by heat for weld, from the viewpoint of preventing generation of void at the welding portion due to contained oxygen, preferably the copper has its content of 99.96% or more and the copper is preferably a low-oxygen copper having an oxygen content of preferably 30 ppm or less, more preferably 20 ppm or less, or an oxygen-free copper. In a case where the conductor is aluminum, from the viewpoint of a required mechanical strength, various aluminum alloys can be used. For example, for such a use as a rotating electrical machine, a 99.00% or more-grade pure aluminum by which a high current value can be obtained is preferred.

As for the conductor used in the present invention, a shape of the cross-section thereof is preferably rectangular. A rectangular conductor is higher than a circular one in terms of the space factor for a stator slot. Therefore, the rectangular conductor is preferred for this use.

In the point of suppressing a partial discharge from edge portions, the rectangular conductor is preferably shaped such that the conductor has chamfered edge portions (curvature radius r) at 4-corners, as shown in, for example, FIGS. 1(a) and 1(b).

From the viewpoint of the space factor described below, the curvature radius r is preferably 0.60 mm or less, and more preferably in the range of 0.20 to 0.40 mm.

The size of the conductor is not particularly limited, because it should be determined in accordance with a use thereof. However, as the length of a side, the width (long side) is preferably from 1.0 mm to 5.0 mm and more preferably from 1.4 mm to 4.0 mm, while the thickness (short side) is preferably from 0.4 mm to 3.0 mm and more preferably from 0.5 mm to 2.5 mm. A cross-section rectangle is more common than a cross-section square. Although the size of the conductor is not particularly limited, a length ratio of the width (long side) and the thickness (short side) is preferably from 1:1 to 4:1.

Meanwhile, as a cross-section of the conductor having a rectangular cross-section used in the present invention, the width and the thickness thereof may be the same length. That is, the cross-section may be an approximate square. In a case where the cross-section of the conductor having a rectangular cross-section is an approximate square, the long side means each of a pair of opposing two sides of the cross-section of the conductor having a rectangular cross-section, while the short side means each of another pair of opposing two sides.

(Space Factor)

In the description, the space factor means a calculated value of a space factor of the conductor in a coil in a case where a motor is molded so that long sides of the insulated wire come to contact with one another and short sides of the insulated wire come to contact with one another. A high conductor space factor improves a space factor in a case of coil molding, so that a high efficient motor can be manufactured. In the description, the space factor is calculated by the following formula.

Space factor=[("length of long side of conductor"×"length of short side of conductor")−{("curvature radius at corner of conductor"×2)$^2$−"curvature radius at corner of conductor"$^2$×π}]/("length of long side of insulated wire"×"length of short side of insulated wire")×100

As an example, the space factor of the insulated wire, in which an insulating layer having a thickness of 100 μm has been coated on a flat surface of the conductor having a long side length of 3.0 mm, a short side length of 1.9 mm, and a curvature radius of 0.30 mm at the corner, is calculated to be 75%.

<Thermosetting Resin Layer (A)>

In the present invention, as an enamel-baked layer, at least one thermosetting resin layer (A) composed of a thermosetting resin is disposed. Ordinarily, the enamel-baked layer is formed by coating and baking an enamel varnish multiple times on a conductor.

The method of coating the resin varnish may be in a usual manner. Examples of the coating method include a method of employing a die for a varnish coating, which has been manufactured so as to be similar to the shape of the conductor, and a method of employing a die that is called "universal die", which has been formed in a curb shape when the cross-section shape of the conductor is quadrangular. The metallic conductor having the varnish of these resins coated thereon is baked by a baking furnace in a usual manner. Although specific baking conditions depend on the shape of a furnace to be used, if the furnace is an about 5 m-sized vertical furnace by natural convection, the baking can be achieved by setting the passing time period to 10 to 90 sec at the temperature of 400 to 650° C.

Meanwhile, the enamel-baked layer of the thermosetting resin layer (A) may be provided directly on an outer periphery of the conductor, or may be provided via, for example, an insulating layer. In this case, said insulating layer shall be omitted in FIGS. 1 to 3.

The thermosetting resin of the thermosetting resin varnish is a thermosetting resin capable of forming an insulating film by coating and baking it on a conductor 1. As the thermosetting resin, polyimide, polyurethane, polyamideimide, polyester, polybenzoimidazole, polyesterimide, a melamine resin, an epoxy resin, and the like can be used. In a thermosetting resin layer 2, a thermosetting resin having a high elastic modulus can be used.

Of these resins, polyester (PEst), polyesterimide (PEsI), polyimide (PI), and polyamideimide (PAI) are preferred. From the viewpoint of thermal aging resistance property of the insulated wire, polyimide (PI) and polyamideimide (PAI) are more preferred.

The polyimide (PI) is not particularly limited and ordinary polyimides such as a whole aromatic polyimide and a thermosetting aromatic polyimide can be used. For example, use may be made of: a commercially available product (for example, trade name, U IMIDE, manufactured by Unitika Ltd.; trade name, U VARNISH, manufactured by Ube Industries, Ltd.; and trade name, HCI series, manufactured by Hitachi Chemical Co., Ltd.; or use may be made of one obtained by a usual method in which an aromatic tetracarboxylic dianhydride and aromatic diamines are reacted in a polar solvent to obtain a polyamide acid solution, and then the obtained polyamide acid solution is subjected to imidization by a thermal treatment at the time of baking in formation of the coating.

As the polyamideimide (PAI), use may be made of a commercially available product (for example, trade name, HI 406, manufactured by Hitachi Chemical Co., Ltd. and trade name, HPC-9000, manufactured by Hitachi Chemical Co., Ltd.); or of one obtained by a usual method in which, for example, a tricarboxylic anhydride and a diisocyanate are allowed to cause direct reaction in a polar solvent, or alternatively firstly a tricarboxylic anhydride is allowed to cause a reaction with a diamine in a polar solvent, to introduce an imido bond, followed by amidation with a diisocyanate.

The polyamideimide (PAI) is a compound having a lower thermal conductivity and a higher dielectric breakdown voltage compared with the other resins and capable of being cured by heating.

Meanwhile, the polyesterimide (PEsI) is a polymer having an ester bond and an imide bond in the molecule, and is synthesized by participation of a free acid group or an anhydride group of the imide in the ester synthesizing reaction of the polyester, in which the imide is synthesized from a tricarboxylic acid anhydride and an amine, and the polyester is synthesized from an alcohol and a carboxylic acid or an alkyl ester of the carboxylic acid. The polyesterimide (PEsI) is not limited, as long as it is thermosetting. The polyesterimide (PEsI) is obtained by use of a commercially available product (for example, trade name, NEO-HEAT 8600 A, manufactured by Totoku Toryo Co., Ltd.), or alternatively is obtained by reacting a tricarboxylic anhydride, a dicarboxylic acid compound or an alkyl ester of the dicarboxylic acid compound, an alcohol compound, and a diamine compound in accordance with a usual method.

In the present invention, various additives such as a cell nucleating agent, an oxidation inhibitor, an antistatic agent, an anti-ultraviolet agent, a light stabilizer, a fluorescent brightening agent, a pigment, a dye, a compatibilizing agent, a lubricating agent, a reinforcing agent, a flame retardant, a crosslinking agent, a crosslinking aid, a plasticizer, a thickening agent, a thinning agent, and an elastomer may be incorporated into the thermosetting resin of thermosetting resin varnish, to the extent that the characteristics are not affected. Furthermore, a layer formed from a resin containing these additives may be laminated on the resulting insulated wire, or the insulated wire may be coated with a coating material containing these additives.

In the present invention, a powder having an aspect ratio such as a glass fiber and a carbon nanotube may be added to a coating material and baked in order to improve a tensile modulus. It is known that by addition of such powder, the powder is aligned in the flow direction of the wire at the processing, so that the wire is strengthened in the bend direction.

The organic solvent of the thermosetting resin varnish which makes the thermosetting resin varnish is not particularly limited as long as the organic solvent does not inhibit the reaction of the thermosetting resin, and examples thereof include amide-based solvents such as N-methyl-2-pyrrolidone (NMP), N,N-dimethylacetamide (DMAC), dimethylsulfoxide, and N,N-dimethylformamide; urea-based solvents such as N,N-dimethylethyleneurea, N,N-dimethylpropyleneurea, and tetramethylurea; lactone-based solvents such as γ-butyrolactone and γ-caprolactone; carbonate-based solvents such as propylene carbonate; ketone-based solvents such as methyl ethyl ketone, methyl isobutyl ketone, and cyclohexanone; ester-based solvents such as ethyl acetate, n-butyl acetate, butyl cellosolve acetate, butyl carbitol acetate, ethyl cellosolve acetate, and ethyl carbitol acetate; glyme-based solvents such as diglyme, triglyme, and tetraglyme; hydrocarbon-based solvents such as toluene, xylene, and cyclohexane; and sulfone-based solvents such as sulfolane. Among these, in view of high solubility, high reaction promotion properties or the like, an amide-based solvent or a urea-based solvent is preferred; and in view of having no hydrogen atom that is apt to inhibit a crosslinking reaction due to heating or the like, N-methyl-2-pyrrolidone, N,N-dimethylacetamide, N,N-dimethylethyleneurea, N,N-dimethylpropyleneurea or tetramethylurea is more preferred, and N-methyl-2-pyrrolidone is particularly preferred.

<Thermoplastic Resin Layer (B)>

As regards the outer layer of the insulated wire of the present invention, it is only a requisite that the outer layer is composed of a thermoplastic resin. The insulated wire of the present invention is used as a member for electric components. Therefore, in the thermoplastic resin layer used in the present invention, it is preferred to use a thermoplastic resin which is excellent in terms of heat resistance and chemical resistance. As such thermoplastic resins, for example, a crystalline thermoplastic resin is preferably used in the present invention.

In the present invention, the term "crystalline" means a property of capable of having a regularly arranged crystalline structure in at least a part of the polymer chain. On the other hand, the term "non-crystalline" means to maintain an amorphous condition which has almost no crystalline structure and means such a property that the polymer chain becomes a random condition in curing.

Examples of the thermoplastic resin which can be used for the thermoplastic resin layer in the present invention include: general-purpose engineering plastics such as polyamide (PA) (nylon), polyacetal (POM), polycarbonate (PC), polyphenylene ether (including a modified polyphenylene ether), polybutylene terephthalate (PBT), polyethylene terephthalate (PET), polyethylene naphthalate (PEN), and ultrahigh molecular weight polyethylene; and in addition, super engineering plastics such as polysulfone (PSF), polyether sulfone (PES), polyphenylene sulfide (PPS), polyarylate (U polymer), polyamideimide, polyether ketone (PEK), polyarylether ketone (PAEK), tetrafluoroethylene/ethylene copolymer (ETFE), polyether ether ketone (PEEK), tetrafluoroethylene/perfluoroalkylvinylether copolymer (PFA), polytetrafluoroethylene (PTFE), a thermoplastic polyimide resin (TPI), polyamideimide (PAI), and a liquid crystal polyester; and further polymer alloys containing the foregoing engineering plastics such as a polymer alloy composed of polyethylene terephthalate (PET) or polyethylene naphthalate (PEN) as a base resin, ABS/polycarbonate, NYLON 6,6, aromatic polyamide resin, polyphenylene ether/NYLON 6,6, polyphenylene ether/polystyrene, and polybutylene terephthalate/polycarbonate. In the present invention, from the viewpoints of heat resistance and stress crack resistance, polyphenylene sulfide (PPS), polyether ketone ketone (PEKK), polyether ketone ketone (PEKK), polyarylether ketone (PAEK) (including modified PEEK), and polyether ether ketone (PEEK) may be preferably used in particular. These thermoplastic resins may be used singly or in combination thereof. Further, it is needless to say that the resin to be used is not limited by the above-described resin names, and resins other than those recited above also can be used, as long as they are superior in performance to those resins.

Among them, crystalline thermoplastic resin preferably includes, for example, polyamide (PA), polyacetal (POM), polybutylene terephthalate (PBT), polyphenylene sulfide (PPS), widely-used engineering plastic such as polyethylene having an ultrahigh molecular weight, and polyether ether ketone (PEEK), polyether ketone (PEK), polyarylether ketone (PAEK) (including modified PEEK), polyether ketone ketone (PEKK), and a thermoplastic polyimide resin (TPI). Polyether ether ketone (PEEK), polyether ketone (PEK), polyarylether ketone (PAEK) (including modified PEEK), and polyether ketone ketone (PEKK) are preferable since they are excellent in chemical resistance.

Examples of the thermoplastic resin which can be used for the thermoplastic resin layer in the present invention include: commercially available products such as PEEK450G manufactured by Victrex Japan Inc. (trade name, tensile modulus at 25° C.: 3,840 MPa) as the PEEK; AVASPIRE AV-650 manufactured by Solvay Co. (trade name, tensile modulus at 25° C.: 3,700 MPa) or AV-651 (trade name, tensile modulus at 25° C.: 3,500 MPa) as the modified PEEK; AURUM PL 450C manufactured by Mitsui Chemicals, Inc. (trade name, tensile modulus at 25° C.: 1,880 MPa) as the TPI; FORTRON 0220A9 manufactured by Polyplastics Co., Ltd. (trade name, tensile modulus at 25° C.: 2,800 MPa), or PPS FZ-2100 manufactured by DIC Corporation (trade name, tensile modulus at 25° C.: 1,600 MPa) as the PPS; XAREC S105 manufactured by Idemitsu Kosan Co., Ltd. (trade name, tensile modulus at 25° C.: 2,200 MPa) as the SPS; and NYLON 6,6 (manufactured by UNITIKA LTD.: FDK-1 (trade name), tensile modulus at 25° C.: 1,200 MPa), NYLON 4,6 (manufactured by UNITIKA LTD.: F-5000 (trade name), tensile modulus at 25° C.: 1,100 MPa), NYLON 6,T (manufactured by Mitsui Chemicals, Inc.: ARLENE AE-420 (trade name), tensile modulus at 25° C.: 2,400 MPa), and NYLON 9,T (manufactured by KURARAY CO., LTD.: GENESTOR N-1006D (trade name), tensile modulus at 25° C.: 1,400 MPa) as the PA. If a thermoplastic resin having a lower tensile modulus than a tensile modulus at 25° C. of the thermosetting resin is selected, a resistance to edge-wise bending due to a thinned thermoplastic resin layer is strengthened and such thermoplastic resins are more preferred. Examples of such resins include polyether ketone (PEK, tensile modulus at 25° C.: 4,000 to 5,000 MPa) and polyether ketone ketone (PEKK, tensile modulus at 25° C.: 4,400 MPa).

If the tensile modulus at 25° C. is less than 1,000 MPa, an effect of being deformed becomes high. If the tensile modulus at 25° C. is 800 MPa or more, a shape-changeable ability due to the thermal plasticity is not deteriorated and further abrasion resistance can be maintained at a good revel. The tensile modulus at 25° C. of the thermoplastic resin is preferably 1,000 MPa or more, and more preferably 2,500 MPa or more. The upper limit of the tensile modulus is not particularly limited. However, owing to the fact that in the case where the tensile modulus of the thermoplastic resin considerably exceeds the tensile modulus of the thermosetting resin used in the thermosetting resin layer, a stress concentrates on an outside thermoplastic resin and the probability of a crack generation due to an edge-wise bending is increased, the tensile modulus is preferably 800 MPa or more and less than 5,000 MPa, more preferably 2,500 MPa or more, and particularly preferably 2,500 MPa or more and 5,000 MPa or less.

The tensile modulus Es at 25° C. of the thermosetting resin used in the present invention is preferably in the range of from 2,000 to 9,000 MPa. When the tensile modulus of the thermosetting resin of the thermosetting resin layer becomes higher than the tensile modulus Ep of the thermoplastic resin, resistance to edge-wise bending is improved. From the viewpoint of improvement in the resistance to edge-wise bending, a difference between the tensile modulus at 25° C. of the thermosetting resin layer and the tensile modulus at 25° C. of the thermoplastic resin layer is preferably 100 MPa or more, more preferably 250 MPa or more, still more preferably 300 MPa or more, and particularly preferably 1,000 MPa or more.

In the insulated wire of the present invention, it is preferred that a difference between the tensile modulus at 25° C. of the thermosetting resin layer and the tensile modulus at 25° C. of the thermoplastic resin layer is 250 MPa or more and the tensile modulus at 25° C. of the thermoplastic resin layer is 2,500 MPa or more, and it is more preferred that a difference between the tensile modulus at 25° C. of the thermosetting resin layer and the tensile modulus at 25° C. of the thermoplastic resin layer is 300 MPa or more and the tensile modulus at 25° C. of the thermoplastic resin layer is 2,500 MPa or more.

Examples of the modified PEEK include PEEK-based PPS, PES, PPSU or PEI polymer alloys and, for example, trade name: AVASPIRE AV-621, AV-630, AV-651, AV-722, AV-848, and the like, manufactured by Solvay Co., can be used.

In the case where because a tensile modulus at 25° C. of a thermoplastic resin is high, a difference between a tensile modulus at 25° C. of the thermosetting resin and the tensile modulus at 25° C. of the thermoplastic resin is small, it is possible to lower crystallinity of the thermoplastic resin in order to decrease the tensile modulus at 25° C. of the thermoplastic resin layer. For this purpose, the thermoplastic resin needs to be a crystalline thermoplastic resin. It is known that resistance to edge-wise bending is strengthen, even if a difference between the tensile modulus at 25° C. of the thermosetting resin layer and the tensile modulus at 25° C. of the thermoplastic resin layer is made large by increasing a tensile modulus at 25° C. of the thermosetting resin by lowering crystallinity.

Meanwhile, the tensile modulus can be measured in accordance with ASTM D882. As regards a commercially available product, the tensile modulus is described in a catalogue provided by a maker.

<Interlayer (C)>

Describing FIG. 3 as an example, an interlayer 4 composed of a non-crystalline thermoplastic resin may be disposed between a thermosetting resin layer 2 and a thermoplastic resin layer 3 for the purpose of enhancement of adhesive force, as long as the idea of the present invention is not undermined.

The non-crystalline thermoplastic resin which can be used for this purpose enables to enhance an adhesive effect by baking and using the resin dissolved in a solvent. For example, the non-crystalline thermoplastic resin preferably includes at least one selected from polyether imide, polyether sulfone, polyphenylene ether, polyphenylene sulfone (PPSU), and polyimide.

As regards the resin used in this layer, one kind may be used alone, or two or more kinds thereof may be used in mixture.

Examples of the polyether imide that can be used include ULTEM (manufactured by GE Plastics, Inc., trade name). Examples of the polyether sulfone that can be used include SUMIKA EXCEL PES (trade name, manufactured by Sumitomo Chemical Co., Ltd.), PES (trade name, manufactured by Mitsui Chemicals, Inc.), ULTRAZONE E (trade name, manufactured by BASF Japan Ltd.), and RADEL A (trade name, manufactured by Solvay Advanced Polymers Co.). Examples of the polyphenylene ether that can be used include XYRON (trade name, manufactured by Asahi Kasei Chemicals Corp.) and IUPIACE (trade name, manufactured by Mitsubishi Engineering Plastics Corp.). Examples of the polyphenylsulfone that can be used include RADEL R (trade name, manufactured by Solvay Advanced Polymers Co.).

(Relationship of Length of Each Layer)

The insulated wire of the present invention has at least one thermosetting resin layer and at least one thermoplastic resin layer, and has an insulating layer composed of an interlayer and the like, if needed.

Here, in the present invention, thickness t1 of the thermoplastic resin layer which coats at least two corner portions of the conductor and thickness t2 of the thermosetting resin layer, satisfy a relation expressed by the following formula 1.

Meanwhile, in the case where the thermosetting resin layer is a multilayer of two or more layers, a total thickness of the entire thermosetting resin layers is t1, and similarly in the case where the thermoplastic resin layer is a multilayer of two or more layers, a total thickness of the entire thermoplastic resin layers is t2.

$$t2/t1 < 1 \quad \text{Formula 1:}$$

In the insulated wire of the present invention, the corner portions at both edges of at least one short side of the conductor having a rectangular cross-section satisfy the above formula 1. Owing to said corners which satisfy the above formula 1, the edge surface by which the above-described short side is formed continuously in the direction of axis is excellent in edge-wise bending workability. Further, the insulated wire of the present invention having such edge surface excels in a space factor of the electric instrument.

Further, in the insulated wire of the present invention, it is preferred that three corner portions of the four corner portions of the conductor having a rectangular cross-section each satisfy the above formula 1, and it is particularly preferred that each of four corner portions of the conductor having a rectangular cross-section satisfies the above formula 1.

Meanwhile, the above formula means that with respect to the corner portions, a thickness of the thermoplastic resin layer which is an extrusion coat resin layer and also an outermost layer which constitutes the insulated layer is thinner than that of the inner enamel-baked layer (thermosetting resin) which constitutes the insulated layer. In the present invention, however, it is particularly preferred that with respect to not only the corner portions, but also four side portions, a thickness of the thermoplastic resin layer which is an extrusion coat resin layer is thinner than that of the inner enamel-baked layer (thermosetting resin) which constitutes the insulated layer.

That is, it is particularly preferred that any of long sides and short sides satisfies the above formula 1, provided that a thickness of the thermoplastic resin layer is designated as t2' and a thickness of the thermosetting resin layer is designated as t1' and further t2' and t1' are deemed to be replaced with t2 and t1, respectively.

The thickness t1 of the corner portion of the thermosetting resin layer is preferably 50 µm or more, more preferably 50 to 200 µm, furthermore preferably 50 to 150 µm furthermore preferably 50 to 110 µm, particularly preferably 55 to 110 µm.

On the other hand, the thickness t2 of the corner portion of the thermoplastic resin layer is preferably 10 to 100 µm or more, more preferably 20 to 80 µm, particularly preferably 20 to 60 µm.

Further, in a case where the insulated wire of the present invention has an interlayer, the thickness t3 of the corner portion of the interlayer is preferably 2 to 20 µm or more, more preferably 3 to 15 µm, particularly preferably 3 to 10 µm.

In the present invention, the thickness of the side other than the corner portion is not particularly limited, as long as it preferably satisfies the above relations. However, the thicknesses described below are preferred.

(Thickness of Side Portion of Thermosetting Resin Layer)

As regards the thickness of side portions of the thermosetting resin layer, the thicknesses of a long side and the thickness of a short side may be different from one another. Further, the thicknesses of two sides which face each other may be the same or different from one another. However, it is preferred that the thicknesses of two sides which face each other are equal to each other. Specifically, the thicknesses is preferably 30 to 200 µm, more preferably 40 to 100 µm, furthermore preferably 40 to 80 µm, particularly preferably 40 to 60 µm.

(Thickness of Side Portion of Thermoplastic Resin Layer)

As regards the thickness of side portions of the thermoplastic resin layer, the thickness of a long side and the thickness of a short side may be different from one another. Further, the thicknesses of two sides which face each other may be the same or different from one another. However, it is preferred that the thicknesses are equal to each other. Specifically, the thickness of side portions of the thermosetting resin layer is preferably 10 to 150 µm, more preferably 20 to 110 µm, furthermore preferably 20 to 80 µm, particularly preferably 30 to 60 µm.

(Thickness of Side Portion of Interlayer Layer)

As regards the thickness of side portions of the interlayer layer, the thickness of a long side and the thickness of a short side may be different from one another. Further, the thickness of two sides which face each other may be the same or different from one another. However, it is preferred that the thicknesses of two sides which face each other is equal to each other. Specifically, the thickness is preferably 2 to 20 µm, more preferably 3 to 15 µm, furthermore preferably 3 to 10 µm, particularly preferably 3 to 6 µm.

The insulated wire of the present invention preferably satisfies a relation expressed by the following formula 3. In particular, it is preferred that the insulated wire of the present invention satisfies the relation represented by said formula 3 and also the tensile modulus at 25° C. of the thermoplastic resin layer is more than 800 MPa.

In the present invention, satisfaction of the relation expressed by the above formula 1 allows to increase resistance to edge-wise bending of the insulated wire which is composed of the conductor having a rectangular cross-section having the above-described curvature radius, and allows to considerably improve workability.

Further, the insulated wire of the present invention preferably satisfies a relation expressed by the following formula 2. Satisfaction of the relation expressed by the following formula 2 allows resistance to edge-wise bending of the insulated wire which is composed of the conductor having a rectangular cross-section having the curvature radius, and allows improvement of workability.

$$t2/t1 \leq 0.7 \qquad \text{Formula 2:}$$

Further, in the insulated wire of the present invention, it is preferred that a difference between a tensile modulus at 25° C. of the thermosetting resin layer and a tensile modulus at 25° C. of the thermoplastic resin layer is 250 MPa or more and the tensile modulus at 25° C. of the thermoplastic resin layer is more than 2,500 MPa. Further, it is more preferred that the insulated wire of the present invention satisfies the relation expressed by the following formula 3. Here, by regulating a thickness ratio of the thermoplastic resin layer with respect to the thermosetting resin layer into 0.5 or less, a resistance property or resistance to surface scratch in the bending work can be enhanced.

$$t2/t1 \leq 0.5 \qquad \text{Formula 3:}$$

The ratio of t2/t1 is set in accordance with a curvature radius of the corner of the conductor. It is preferred that as the curvature radius becomes smaller, this ratio also becomes smaller. For example, in the case where the curvature radius is 0.60 mm, the ratio of t2/t1 is preferably set to 0.99 or less, while in the case where the curvature radius is 0.40 mm, the ratio of t2/t1 is preferably set to less than 0.70. Further, in the case where the curvature radius is 0.30 mm, the ratio of t2/t1 is preferably set to less than 0.50. In any of these cases, the ratio of t2/t1 is largely affected by a kind and a film thickness of the resin and therefore the lower limit thereof is good enough as long as it is within a range of capable of achieving the property. However, the range of 0.2 or more is practical.

Meanwhile, similarly to formula 1, the relation of the thickness relating to the side portions is also applied to formulae 2 and 3 as a preferable relation.

In order to give a desired thickness and shape to the corner portion and the side portion, it is convenient to adjust them using a die.

Meanwhile, in the case where the thickness is adjusted at the baking step, adjustment can be done by fixation of the die shape and by the baking number of times until a necessary thickness is obtained.

By manufacturing the insulated wire of the present invention so that the insulating layer is constituted as described above, workability of the edge-wise bending in particular is largely improved and consequently the workability is excellent.

Although the reason why such excellent workability as described above is obtained is not clear yet, it is thought to be due to a relation between strain and stress as described below.

That is, in the case where the thermoplastic resin simple body is subjected to stress in the tensile direction by bending, the stress σp is expressed by the following formula (a).

$$\sigma p = Ep \times \varepsilon p \quad \text{Formula (a):}$$

In formula (a), Ep represents a tensile modulus of the thermoplastic resin and εp represents a strain applied to the thermoplastic resin.

On the other hand, in the case where the thermosetting resin simple body is subjected to stress in the tensile direction by bending, the stress σs is expressed by the following formula (b).

$$\sigma s = Es \times \varepsilon s \quad \text{Formula (b):}$$

In formula (b), Es represents a tensile modulus of the thermosetting resin and εs represents a strain applied to the thermosetting resin.

Here, the overall cross-sectional area Sall of the thermosetting resin and the thermoplastic resin is expressed by the following formula (c).

$$\text{Overall cross-sectional area } Sall = Sp + Ss \quad \text{Formula (c):}$$

In formula (c), Sp represents a cross-sectional area of the thermoplastic resin and Ss represents a cross-sectional area of the thermosetting resin.

In the case where a thermoplastic resin and a thermosetting resin constitute a composite body like an insulating layer of the insulated wire of the present invention, a strain of the overall wire εall, in the case that the wire is subjected to a stress in the tensile direction by bending, satisfies a relation expressed by the following formula (d).

$$\varepsilon all = \varepsilon p = \varepsilon s \quad \text{Formula (d):}$$

That is, strains of the thermosetting resin layer and the thermoplastic resin generated at the bonded interface between them must be regulated in a way that they coincide with each other not to cause discontinuity of the strain at the bonded interface.

As just described, in case of satisfying the relation expressed by the above formula (d), from the following formula (e), it is understood that one having a higher tensile modulus takes one's share of a larger amount of stress.

$$\sigma p / Ep = \sigma s / Es \quad \text{Formula (e):}$$

On the other hand, a stress applied to the overall composite body is expressed by the following formula (f).

$$Sall \times \sigma all = Sp \times \sigma p + Ss \times \sigma s \quad \text{Formula (f):}$$

In the present invention, the tensile modulus Es of the thermosetting resin to be used is in the range of 3,500 to 9,000 MPa like polyimide (PI) and the like, and is higher than the tensile modulus Ep of the thermoplastic resin. From the above, it is understood that as a ratio of the thermosetting resin layer per cross-sectional area increases, a stress applied to the thermoplastic resin decreases. That is, this increases the possibility of not generating a crack.

Here, the foregoing leads to the importance that the ratio t2/t1 of the above-described formula 1 is less than 1.0 in terms of thickness of the coat layers including a thermoplastic resin layer and a thermosetting resin layer of the above described composite body.

The ratio t2/t1 is preferably 0.7 or less, more preferably 0.5 or less.

Further, in the case where the ratio t2/t1 is 0.5 or less, a material having a tensile modulus of 2,500 MPa or more is desirable. In this way, reduction in stiffness of the thermoplastic resin layer due to reduction in the film thickness of the thermoplastic resin layer can be compensated.

(Thickness of Each Layer)

In the present invention, restriction of the film thickness of each of layers covering a corner portion of the conductor is important. Since the thickness t1 of the thermosetting resin layer is not particularly limited, 20 to 150 μm is practical and preferable. In order to increase resistance to edge-wise bending, 50 to 110 μm is more preferably.

On the other hand, as for the thickness t2 of the thermoplastic resin layer, the range of 20 μm to 150 μm is practical. The range of 30 μm to 100 μm is more preferred from the viewpoint that a uniform film can be molded without uneven thickness or the like.

Here, in the insulated wire of the present invention, t1 and t2 satisfy a relation expressed by formula 1: t2/t1<1. That is, the insulating layer of the insulated wire of the present invention satisfies the relation expressed by this formula 1, so that a stress applied to the overall insulating layers due to the edge-wise bending is effectively shared by a thermosetting layer. As the result, a thermoplastic resin layer becomes resistant to destruction.

(Method of Producing Insulated Wire)

Hereinafter an example of a method of producing the insulated wire of the present invention is explained.

(a) Formation of Thermosetting Resin Layer

In order to form a thermosetting layer, for example, is used a die which has a shape similar to the outer shape of the cross-section of the thermosetting layer formed on a conductor, and a shape which allows to obtain desired thicknesses of the side portion and a corner portion. A thermosetting resin is coated on the conductor and was allowed to pass through a baking furnace set to a temperature of 400 to 650° C. at a speed requiring from 8 to 25 seconds for a baking time. Then, by repeating this step, an enamel wire in which the thermosetting resin layer has been formed, can be obtained Meanwhile, a thermosetting resin layer can be also formed by using an organic solvent or the like and a thermosetting resin.

(b) Formation of Thermoplastic Resin Layer

An insulated wire can be obtained by using the obtained enamel wire as a core wire, and by extrusion-coating a thermoplastic resin on the enamel wire using a screw of the extruder. At this time, the extrusion-coating of the thermoplastic resin is carried out using an extrusion die at a temperature which is equal to or more than a melting point of the thermoplastic resin (in case of a non-crystalline resin, at least a glass transition temperature) so that the outer shape of the cross-section of the extrusion-coating resin layer becomes similar to the shape of the conductor and becomes a shape by which desired thicknesses of the side portion and the corner portion can be obtained.

Meanwhile, a thermoplastic resin layer can also be formed by using an organic solvent or the like and a thermoplastic resin.

The above-described interlayer may be formed on an enamel wire by extrusion-coating or baking, and a thermoplastic resin layer may be also formed on the interlayer by extrusion-coating.

The insulated wire of the present invention is applicable to a field which requires resistance to voltage and heat resistance, such as various kinds of electric equipment (may be also called electronic equipment). For example, the insulated wire of the present invention is used for a motor, a transformer and the like, which can compose high-performance electric equipment. In particular, the insulated wire is preferably used as a winding for a driving motor of HV (Hybrid Vehicles) and EV (Electric Vehicles). As just described, the present invention can provide electric equipment, particularly a driving motor of HV and EV, equipped with the insulated wire. Meanwhile, in the case where the insulated wire of the present invention is used for a motor coil, it is also called an insulated wire for the motor coil.

EXAMPLES

The present invention will be described in more detail based on examples given below, but the invention is not meant to be limited by these. Meanwhile, in the following Examples, the percent value (%) indicating the composition means percent (%) by mass.

Insulated wires used in Examples and Comparative Examples were produced in the manner described below.

Example 1

As the conductor, a cross-section rectangular (long side 3.0 mm×short side 1.9 mm, curvature radius of chamfered edge at four corners r=0.3 mm) conductor (copper having an oxygen content of 15 ppm) as shown in Table 1(a) was used.

In formation of the thermosetting resin layer [enamel-baked layer], was used a die having a shape similar to the outer shape of the cross-section of the thermosetting resin layer to be formed on the conductor, and having the shape capable of obtaining the thicknesses of the side portion and the corner portion described in Table 1. The thermosetting layer each having 70 μm-thick long side and short side and having the thickness of 80 μm in terms of the thickness t1 shown in FIG. 1 at 4 corner portions, was formed on the conductor in such a manner that a polyamide imide resin (PAI) varnish (trade name, HPC-9000, manufactured by Hitachi Chemical Co., Ltd., tensile modulus at 25° C.: 4,100 MPa) was coated on the conductor, and then the coated conductor was passed through a 8 m-long baking furnace set to 450° C. at a speed requiring 15 seconds for the baking time, and then this step was repeated several times to obtain an enamel wire.

The obtained enamel wire was used as a core wire. A screw of the extruder specified by 30 mm full flight, L/D=20, and compression ratio 3 was used. As the thermoplastic resin, a polyether ether ketone resin (PEEK) (trade name, PEEK 450G, manufactured by Victrex Japan Co., Ltd., tensile modulus at 25° C.: 3,840 MPa) was used. An extrusion die was used in such a manner that the outer shape of the cross-section of the extrusion-coating resin layer became a shape similar to a shape of the conductor whereby the thickness of the side portion and the thickness of the corner portion each described in Table 1 were obtained by the shape. An extrusion coat of PEEK was conducted at 370° C., and then on the outside of the thermosetting resin layer, was formed a thermoplastic resin layer [extrusion coat resin layer] each having a 21 μm-thick long side and a 21 μm-thick short side and having the thickness of 30 μm in terms of the thickness t2 shown in FIG. 1 at 4 corner portions to obtain an insulated wire composed of the PEEK extrusion coat enamel wire.

Examples 2 to 10 and Comparative Examples 1 to 4

Insulated wires composed of thermoplastic resin extrusion coat enamel wires were obtained in the same manner as Example 1, except that the thermoplastic resin, the thermosetting resin, and the thickness of each of the layers each used in Example 1 were each changed to the thermoplastic resin, the thermosetting resin, and the thickness of each of the layers shown in the following Tables 1 and 3.

Meanwhile, in Example 10, a thermoplastic resin layer was extrusion-coated so as to have such a configuration that a polyphenylene sulfide resin (PPS) (trade name, FORTRON 0220A9, manufactured by Polyplastics Co., Ltd, tensile modulus at 25° C.: 2,800 MPa) layer was disposed in contact with an enamel-baked layer of the thermosetting resin layer and a PEEK layer using the same polyether ether ketone resin as Example 1 was disposed on the PPS layer.

Example 11

An enamel wire was obtained in such a manner as Example 1 that in Example 1, the resin (PAI) varnish for forming the thermosetting resin layer [enamel-baking layer] was replaced with the resin varnish shown in the following Table 2, and the thermosetting resin layer having each of the thickness shown in the following Table 2 was formed in the same manner as Example 1.

Next, a resin varnish in which a polyphenyl sulfone resin (PPSU) (trade name, RADEL R5800, manufactured by Solvay Specialty Polymers Co.) was dissolved in N-methy-2-pyrolidone (NMP) to make a solution having a resin content of 20% by mass was coated on the above-described enamel wire using a die having a shape similar to the shape of the conductor, and having the shape capable of obtaining the thicknesses of the side portion and the corner portion described in the following Table 2. Then, the coated enamel wire was passed through a 8 m-long baking furnace set to 450° C. at a speed requiring 15 seconds for the baking time, thereby forming a 6 μm-thick interlayer (non-crystalline resin layer) [adhesive layer]. Thus, an enamel wire provided with an adhesive layer was obtained.

The obtained enamel wire provided with the adhesive layer was used as a core wire. As the thermoplastic resin, the same PEEK as Example 1 was used. On the outside of the interlayer (non-crystalline resin layer) [adhesive layer], a thermoplastic resin layer [extrusion coat resin layer] having each of the thicknesses shown in the following Table 2 was formed in the same manner as Example 1 to obtain an insulated wire composed of the PEEK extrusion coat enamel wire shown in FIG. 3.

Examples 12 to 14

Insulated wires composed of thermoplastic resin extrusion coat enamel wires were obtained in the same manner as Example 11, except that the thermosetting resin, the non-crystalline resin, the thermoplastic resin, and the thickness of each of the layers each used in Example 11 were each changed as shown in the following Table 2.

Meanwhile, in Example 13, a thermoplastic resin layer was extrusion-coated so as to have such a configuration that a modified polyetherether ketone resin (trade name, AVASPIRE AV-650, manufactured by Solvay Co., tensile modulus at 25° C.: 3,700 MPa) was disposed in contact with an enamel-baked layer of the thermosetting resin layer, and a PEEK layer using the same polyether ether ketone resin as Example 1 was disposed on the modified PEEK layer.

The resins used in each of Examples are described below. In Tables 1 to 3, the names of the resins are described by abbreviation.

[Thermosetting Resin]
PAI: Polyamideimide Resin
(1) PAI manufactured by Hitachi Chemical Co., Ltd., trade name: HPC-9000, tensile modulus at 25° C.: 4,100 MPa
(This was used in Examples 1, 4, 8, 10, 12 and 13, and Comparative Examples 1 and 2.)
(2) PAI manufactured by Toyobo co., ltd., trade name: HR16NN, tensile modulus at 25° C.: 6,000 MPa
(This was used in Example 2.)
PI: polyimide
(3) PI manufactured by Unitika Ltd., trade name: U IMIDE AR, tensile modulus at 25° C.: 9,500 MPa
(This was used in Examples 3 and 14, and Comparative Example 4.)
(4) PI manufactured by Ube Industries, Ltd., trade name: U-VARNISH-A, tensile modulus at 25° C.: 3,730 MPa
(This was used in Examples 5, 7 and 11, and Comparative Example 3.)
(5) PEsI: Polyesterimide (manufactured by Totoku Toryo Co., Ltd., trade name: NEOHEAT 8600 A, tensile modulus at 25° C.: 2,500 MPa)
(This was used in Example 6.)
(6) PEst: Polyester (manufactured by Totoku Toryo Co., Ltd., trade name: LITON3300KF, tensile modulus at 25° C.: 2,000 MPa)
(This was used in Example 9.)

[Non-Crystalline Resin]
(1) PPSU: polyphenylene sulfone (manufactured by Solvay Specialty Polymers Co., trade name: RADEL R5800)
(This was used in Examples 11 and 14.)
(2) PEI: polyetherimide (manufactured by Saudi Basic Industries Corporation, trade name: ULTEM 1010)
(This was used in Example 12.)
(3) PES: polyether sulfone (manufactured by Sumitomo Chemical Co., Ltd., trade name: SUMIKA EXCEL 4800G)
(This was used in Example 13.)

[Thermoplastic Resin]
(1) PEEK: polyether ether ketone (manufactured by Victrex Japan Co., Ltd., trade name: PEEK450G, tensile modulus at 25° C.: 3,840 MPa)
(This was used in Examples 1, 3, 10, 11 and 13, and Comparative Examples 1 and 2.)
(2) Modified PEEK: modified polyether ether ketone (manufactured by Solvay Co, trade name: AVASPIRE AV-650, tensile modulus at 25° C.: 3,700 MPa)
(This was used in Examples 2, 12 and 13.)
(3) PEKK: polyether ketone ketone (manufactured by Oxford Performance Materials, trade name: OXPEKK-IG100, tensile modulus at 25° C.: 4,000 MPa)
(This was used in Example 4.)
(4) TPI: thermoplastic polyimide resin (manufactured by Mitsui Chemicals, Inc., trade name: AURUM PL 450C, tensile modulus at 25° C.: 1,880 MPa)
(This was used in Example 5.)
(5) Aromatic PA: aromatic polyamide (manufactured by Du Pont, trade name: Zytel HTN, tensile modulus at 25° C.: 2,280 MPa)
(This was used in Example 6.)
(6) PPS: polyphenylene sulfide (manufactured by Polyplastics Co., Ltd, trade name: FORTRON 0220A9, tensile modulus at 25° C.: 2,800 MPa)
(This was used in Examples 7, 10 and 14, and Comparative Example 3.)
(7) PET: polyethylene terephthalate (manufactured by Teijin limited, trade name: PET resin TR-8550T, tensile modulus at 25° C.: 2,800 MPa)
(This was used in Example 8.)
(8) PA66: polyamide 66 (manufactured by Asahi Kasei Corporation, trade name: LEONA 1300S, tensile modulus at 25° C.: 3,000 MPa)
(This was used in Example 9 and Comparative Example 4.)

Meanwhile, in Example 10, the PEEK resin of (1) and the PPS resin of (6) were used and the resin of (1) as an outer layer and the resin of (6) as an inner layer were coated. Further, in Example 13, the PEEK resin of (1) and the modified PEEK resin of (2) were used and the resin of (1) as an outer layer and the resin of (2) as an inner layer were coated.

Each of the insulated wires obtained in Examples 1 to 14 and Comparative Examples 1 to 4 was subjected to a winding work and evaluations described below were carried out.

[Space Factor]

The space factor was evaluated by a curvature radius of the cross-sectional corner portion of the used conductor.

The curvature radius of the cross-sectional corner portion of the used conductor was rated on the following four criteria:

An insulated wire in which the cross-sectional corner portion of the conductor had a curvature radius of 0.10 mm or less was rated as "A" on the grounds that an efficiency-enhancing effect of the motor was high;

An insulated wire in which the cross-sectional corner portion of the conductor had a curvature radius of more than 0.10 mm and 0.30 mm or less was rated as "B" on the grounds that there was an efficiency-enhancing effect of the motor;

An insulated wire in which the cross-sectional corner portion of the conductor had a curvature radius of more than 0.30 mm and 0.60 mm or less was rated as "C" on the grounds that although an efficiency-enhancing effect of the motor was small, the effect is seen; and An insulated wire in which the cross-sectional corner portion of the conductor had a curvature radius of more than 0.60 mm was rated as "D" on the grounds that it lacked almost no advantage compared to an insulated wire using a round conductor. Meanwhile, at least the rate "C" is an acceptable level.

In the description, the space factor of the motor was evaluated by a curvature radius of the cross-sectional corner portion of the conductor. This is attributed by the things that when winding of a motor coil was carried out using a cross-section rectangular insulated wire, an insulating film at the side portion (flat portion) of the conductor equally becomes thin due to pressure and therefore the contribution thereof is small, whereas an insulating film at the corner portion of the conductor maintains almost the film thickness at the time of molding.

[Edge-Wise Bending Property]

The edge-wise bending test was carried out in accordance with JIS3216-3.

Meanwhile, in order to impose more strict condition on the insulated wire, the edge-wise bending test was carried out by making a 5 μm-deep incision in the portion to be bent of the insulated wire obtained in Examples 1 to 14 and Comparative Examples 1 to 4 using a feather razor S single-edged razor blade (manufactured by FEATHER Safety Razor Co., Ltd.). The incised insulated wires of Examples 1 to 14 and Comparative Examples 1 to 4 were wound around a φ1.5 mm SUS rod so that an incision portion was a center of the insulated wire, and were bent for evaluation. The edge-wise bending workability was rated on the following three criteria:
A conductor-exposed insulated wire was rated as "D";
An insulated wire in which a crack generation occurred in a thermoplastic resin film, but the crack did not reach a thermosetting resin layer was rated as "B"; and An insulated wire in which an incision portion was also stretched together with the wire itself so that the incision did not develop, was rated as "A". At least the rate "B" is an acceptable level.

[Thermal Aging Resistance Property]

The thermal aging resistance property was evaluated using an arrow-pair in which 2 square-shape insulated wires were combined with each other in such a manner that a bend radius R was 10 mm and a flat portion contact length was 10 cm and the insulated wires were fixed with clips. The arrow-pair was placed in a thermostat bath set to 200° C. and after a lapse of 100 hours the arrow-pair was taken out of the bath, and then was left to stand and allowed to reach to room temperature (25° C.). After that, an electric continuity check was carried out by a voltage of 2.4 kV. Similarly, the lapse of time was increased in the 100-hour unit, such as the lapse of 200 hours and the lapse of 300 hours to check the electric continuity by a voltage of 2.4 kV.

The thermal aging resistance property was rated on the following four criteria:
An insulated wire being in no conduction state even after a lapse of 1000 hours was rated as "A" on the grounds that it was excellent in heat resistance in particular;
An insulated wire being in no conduction state for 400 hours or more but in conduction state within a lapse of less than 1000 hours from start of heat was rated as "B" on the grounds that it was such a level that there was no problem in quality;
An insulated wire being in no conduction state for 100 hours or more but being in conduction state within a lapse of less than 400 hours from start of heat was rated as "C" on the grounds that it was such a level that a durable life of the insulated wire was satisfied so that problems did not occur within a required period; and
An insulated wire being in conduction state within a lapse of less than 100 hours was rated as "D". At least the rate "C" is an acceptable level.

The obtained results are described in the following Tables 1 to 3 as a whole.

TABLE 1

| | | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|---|
| Thermo-plastic resin | Kind | PEEK | Modified PEEK | PEEK | PEKK | TPI | Aromatic PA | PPS | PET | PA66 | PPS/PEEK |
| | Thickness t2 (μm) | 30 | 36 | 40 | 30 | 75 | 45 | 48 | 40 | 20 | 30/30 |
| | Thickness of side portion (μm) | 21 | 28 | 30 | 25 | 55 | 33 | 38 | 35 | 15 | 26/25 |
| | Tensile modulus at 25° C. (MPa) | 3,840 | 3,700 | 3,840 | 4,000 | 1,880 | 2,280 | 2,800 | 2,800 | 3,000 | 2,800/3,840 |
| Thermo-setting resin | Kind | PAI | PAI | PI | PAI | PI | PEsI | PI | PAI | PEst | PAI |
| | Thickness t1 (μm) | 80 | 80 | 60 | 110 | 110 | 80 | 51 | 55 | 90 | 80 |
| | Thickness of side portion (μm) | 70 | 70 | 45 | 100 | 100 | 70 | 45 | 50 | 95 | 70 |
| | Tensile modulus at 25° C. (MPa) | 4,100 | 6,000 | 9,500 | 4,100 | 3,730 | 2,500 | 3,730 | 4,100 | 2,000 | 4,100 |
| Thermoplastic resin thickness t2/Thermosetting resin thickness t1 | | 0.38 | 0.45 | 0.67 | 0.27 | 0.68 | 0.56 | 0.96 | 0.72 | 0.22 | 0.75 |
| t1 + t2 (μm) | | 110 | 116 | 100 | 140 | 185 | 120 | 99 | 95 | 110 | 140 |
| Curvature radius of conductor r (mm) | | 0.30 | 0.29 | 0.35 | 0.10 | 0.35 | 0.40 | 0.50 | 0.45 | 0.20 | 0.10 |
| Space factor | | B | B | C | A | C | C | C | C | B | A |
| Edge-wise bending | | B | A | B | B | B | B | B | B | C | B |
| Thermal aging resistance property | | A | A | A | A | B | B | C | C | B | A |

"Ex" is an abbreviation of "Example".

TABLE 2

| | | Ex 11 | Ex 12 | Ex 13 | Ex 14 |
|---|---|---|---|---|---|
| Thermoplastic resin | Kind | PEEK | Modified PEEK | Modified PEEK/PEEK | PPS |
| | Thickness t2 (μm) | 40 | 20 | 30/35 | 30 |
| | Thickness of side portion (μm) | 38 | 15 | 25/25 | 25 |
| | Tensile modulus at 25° C. (MPa) | 3,840 | 3,700 | 3,700/3,840 | 2,800 |

TABLE 2-continued

|  |  | Ex 11 | Ex 12 | Ex 13 | Ex 14 |
|---|---|---|---|---|---|
| Interlayer (non-crystalline resin) | Kind | PPSU | PEI | PES | PPSU |
|  | Thickness t3 (μm) | 6 | 10 | 3 | 10 |
| Thermosetting resin | Kind | PI | PAI | PAI | PI |
|  | Thickness t1 (μm) | 80 | 60 | 70 | 50 |
|  | Thickness of side portion (μm) | 90 | 65 | 72 | 50 |
|  | Tensile modulus at 25° C. (MPa) | 3,730 | 4,100 | 4,100 | 9,500 |
| Thermoplastic resin thickness t2/ Thermosetting resin thickness t1 |  | 0.50 | 0.33 | 0.92 | 0.60 |
| t1 + t2 + t3 (μm) |  | 136 | 90 | 138 | 90 |
| Curvature radius of conductor r (mm) |  | 0.33 | 0.10 | 0.30 | 0.33 |
| Space factor |  | C | A | B | C |
| Edge-wise bending |  | B | A | A | A |
| Thermal aging resistance property |  | A | A | A | C |

"Ex" is an abbreviation of "Example".

TABLE 3

|  |  | Comparative Example 1 | Comparative Example 2 | Comparative Example 3 | Comparative Example 4 |
|---|---|---|---|---|---|
| Thermoplastic resin | Kind | PEEK | PEEK | PPS | PA66 |
|  | Thickness t2 (μm) | 55 | 110 | 60 | 40 |
|  | Thickness of side portion (μm) | 40 | 80 | 50 | 32 |
|  | Tensile modulus at 25° C. (MPa) | 3,840 | 3,840 | 2,800 | 3,000 |
| Thermosetting resin | Kind | PAI | PAI | PI | PI |
|  | Thickness t1 (μm) | 50 | 30 | 60 | 50 |
|  | Thickness of side portion (μm) | 45 | 25 | 45 | 42 |
|  | Tensile modulus at 25° C. (MPa) | 4,100 | 4,100 | 3,730 | 9,500 |
| Thermoplastic resin thickness t2/ Thermosetting resin thickness t1 |  | 1.1 | 3.66 | 1.0 | 0.80 |
| t1 + t2 (μm) |  | 115 | 140 | 120 | 90 |
| Curvature radius of conductor r (mm) |  | 0.30 | 0.32 | 0.60 | 0.70 |
| Space factor |  | B | C | C | D |
| Edge-wise bending |  | D | D | D | B |
| Thermal aging resistance property |  | A | A | C | B |

It is apparent from Table 1 that the insulated wires of Examples 1 to 10 each of which satisfied the relation expressed by formula 1 according to the present invention exhibited a large space ratio and were excellent in an edge-wise bending workability. Further, it is seen that the insulated wires of Examples 1 to 6 and 9 each of which also satisfies the relation expressed by formula 2 according to the present invention were excellent in terms of not only a space ratio and an edge-wise bending workability but also a thermal aging resistance property. Meanwhile, although Example 10 did not satisfy the relation expressed by formula 2 according to the present invention, the insulated wire was excellent in terms of an edge-wise bending workability and a thermal aging resistance property, because PEEK was used as a thermal plastic resin.

Further, it is apparent from Table 2 that all of the insulated wires of Examples 11 to 14 each of which satisfied the relation expressed by formula 1 according to the present invention and had an interlayer in the insulating layer were considerably excellent in an edge-wise bending workability. In particular, the insulated wires of Examples 11 to 13 were excellent in not only an edge-wise bending workability but also a thermal aging resistance property.

In contrast to the foregoing, it is apparent from Table 3 that as regards the insulated wires of Comparative Examples 1 to 3 each of which did not satisfy the relation expressed by formula 1 in the present invention, the conductor thereof resulted in exposure by the edge-wise bending test. Further, the insulated wire of Comparative Example 4 was inferior in terms of a space factor on the grounds that the curvature radius r of the conductor exceeded 0.60 mm.

Having described our invention as related to the present embodiments, it is our intention that the invention not be limited by any of the details of the description, unless otherwise specified, but rather be construed broadly within its spirit and scope as set out in the accompanying claims.

REFERENCE SIGNS LIST

1 Conductor
2 Thermosetting resin layer
3 Thermoplastic resin layer
4 Interlayer
t1 Thickness of corner portion of thermosetting resin layer
t2 Thickness of corner portion of thermoplastic resin layer
t3 Thickness of corner portion of thermoplastic interlayer

The invention claimed is:
1. An insulated wire comprising:
at least one thermosetting resin layer; and
at least one thermoplastic resin layer,
wherein the at least one thermosetting resin layer and the at least one thermoplastic resin layer are provided as an insulating layer in this order on a conductor having a rectangular cross-section, a curvature radius r of corner portions at both edges of at least one short side of the conductor being 0.6 mm or less, wherein at least one resin constituting the thermoplastic resin layer is a thermoplastic resin selected from the group consisting of a polyether ether ketone, a modified polyether ether ketone, a thermoplastic polyimide, polyamideimide, and an aromatic polyimide, wherein thickness t1 of the corner portion of the thermosetting resin layer and thickness t2 of the corner portion of the thermoplastic resin layer satisfy a relation expressed by the following Formula 1:

$t2/t1 < 1.$  Formula 1:

2. The insulated wire according to claim 1, wherein the curvature radius r of the corner portion is 0.4 mm or less and t1 and t2 satisfy a relation expressed by the following Formula 2:

$t2/t1 \leq 0.7.$  Formula 2:

3. The insulated wire according to claim 1, wherein t1 is 50 μm or more.

4. The insulated wire according to claim 1, wherein a tensile modulus at 25° C. of the thermosetting resin layer is larger than a tensile modulus at 25° C. of the thermoplastic resin layer.

5. The insulated wire according to claim 1, wherein a difference between the tensile modulus at 25° C. of the thermosetting resin layer and the tensile modulus at 25° C. of the thermoplastic resin layer is 250 MPa or more and the tensile modulus at 25° C. of the thermoplastic resin layer is more than 2,500 MPa.

6. The insulated wire according to claim 1, having an interlayer comprising a non-crystalline thermoplastic resin between the thermoplastic resin layer and the thermosetting resin layer.

7. A motor coil comprising the insulated wire according to claim 1 which has been subjected to a wind-processing.

8. An electric/electronic equipment produced by processing the insulated wire according to claim 1 by winding.

9. A method of producing an insulated wire comprising at least one thermosetting resin layer and at least one thermoplastic resin layer, provided in this order on a conductor having a rectangular cross-section, a curvature radius r of corner portions at both edges of at least one short side of the conductor being 0.6 mm or less, comprising a step of:

baking the thermosetting resin layer; and extrusion-molding the thermoplastic resin layer, thereby to make thickness t1 of a corner portion of the thermosetting resin layer and thickness t2 of a corner portion of the thermoplastic resin layer satisfy a relation expressed by the following Formula 1:

$t2/t1 < 1.$  Formula 1:

* * * * *